US007535825B1

(12) United States Patent
Callon

(10) Patent No.: US 7,535,825 B1
(45) Date of Patent: *May 19, 2009

(54) NETWORK ROUTING USING LINK FAILURE INFORMATION

(75) Inventor: Ross W. Callon, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 466 days.

This patent is subject to a terminal disclaimer.

(21) Appl. No.: 11/358,355

(22) Filed: Feb. 21, 2006

Related U.S. Application Data

(63) Continuation of application No. 09/810,986, filed on Mar. 16, 2001, now Pat. No. 7,035,202.

(51) Int. Cl.
*G06F 11/00* (2006.01)
*G06F 15/173* (2006.01)

(52) U.S. Cl. .............. 370/216; 370/242; 370/250; 709/238

(58) Field of Classification Search ......... 370/216–250, 370/392, 400–410; 709/238–242
See application file for complete search history.

(56) References Cited

U.S. PATENT DOCUMENTS

| | | | |
|---|---|---|---|
| 5,093,824 A | 3/1992 | Coan et al. | |
| 5,964,841 A | 10/1999 | Rekhter | |
| 6,154,444 A | 11/2000 | Masuo et al. | |
| 6,173,324 B1 | 1/2001 | D'Souza | |
| 6,425,004 B1 | 7/2002 | Hardjono | |
| 6,697,325 B1 | 2/2004 | Cain | |
| 6,757,286 B1 | 6/2004 | Stone | |
| 6,757,289 B1 | 6/2004 | Cain et al. | |
| 6,760,777 B1 | 7/2004 | Agarwal et al. | |
| 6,914,886 B2* | 7/2005 | Peles et al. | 370/254 |
| 7,139,242 B2* | 11/2006 | Bays | 370/238 |

OTHER PUBLICATIONS

Sangjin Jeong et al., Optical BGP Routing Convergence in Lightpath Failure of Optical Internet, Apr. 2002, ETRI Journal, vol. 24, No. 2, pp. 97-107.
Craig Labovitz et al., "An Experimental Study of Internet Routing Convergence.", Aug. 2000.

(Continued)

*Primary Examiner*—Tri H Phan
(74) *Attorney, Agent, or Firm*—Shumaker & Sieffert, P.A.

(57) ABSTRACT

Link failure messages are sent through a network to accelerate convergence of routing information after a network fault. The link failure messages reduce the oscillations in routing information stored by routers, which otherwise can cause significant problems, including intermittent loss of network connectivity as well as increased packet loss and latency. For example, the link failure messages reduce the time that a network using a path vector routing protocol, such as the Border Gateway Protocol (BGP), takes to converge to a stable state. More particularly, upon detecting a network fault, a router generates link failure information to identify the specific link that has failed. In some types of systems, the router communicates the link failure information to neighboring routers as well as a conventional update message withdrawing any unavailable routes. Once other routers receive the link failure information, the routers do not attempt to use routes that include the failed link.

7 Claims, 7 Drawing Sheets

OTHER PUBLICATIONS

Y. Rekhter, T. Li, "A Border Gateway Protocol 4 (BGP-4)," RFC 1771, Mar. 1995.

J. Noel Chiappa, "A New IP Routing and Addressing Architecture," 1991.

J. Noel Chiappa, "Ipng Technical Requirements of the Nimrod Routing and Addressing Architecture," RFC 1753, Dec. 1994.

Stephen Kent et al., "Secure Border Gateway Protocol (S-BGP)-Real World Performance and Deployment Issues.", Feb. 2000.

S. Kent, C. Lynn, K. Seo, "Secure Border Gateway Protocol (S-BGP)" IEEE, Inc., vol. 18, part 4, pp. 582-592, 2000.

I. Castineyra, N. Chiappa, M. Steenstrup, "The Nimrod Routing Architecture," RFC 1992, Aug. 1996.

* cited by examiner

| ORIGIN ID 22 | INSTANCE ID 24 | TIMESTAMP 26 | LINK DESCRIPTOR 28 | TIME$_{VALID}$ 30 | TIME$_{STORE}$ 32 | SECURITY DATA 34 |

NETWORK ROUTING USING LINK FAILURE INFORMATION

CROSS REFERENCE TO RELATED APPLICATIONS

This application is a continuation of U.S. application Ser. No. 09/810,986, filed Mar. 16, 2001, the entire contents of which is incorporated herein by reference.

TECHNICAL FIELD

The invention relates to computer networks and, more particularly, to the use of link failure information to improve routing stability.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network referred to as routers maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

Large computer networks, such as the Internet, often include many routers grouped into administrative domains called "autonomous systems." The autonomous systems exchange routing information according to a defined protocol, such as the Border Gateway Protocol (BGP). When two autonomous systems initially connect, they exchange their entire BGP routing tables. The autonomous systems then use control messages to incrementally update the routing tables when the network topology changes. For example, the autonomous systems send update messages to advertise newly available routes and withdraw routes that are no longer available.

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets in the event an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

For example, according to many routing protocols, when a router detects a link failure, the router broadcasts one or more update messages to inform neighboring routers of the routes that are no longer available and that should be removed from local routing tables. The receiving routers recalculate their routing tables and send update messages to their neighbors. This process repeats itself and the update information propagates outward until it reaches all of the routers within the network. The form of the update message depends on the type of routing algorithm used.

One of the best-known routing algorithms is the distance vector algorithm. The distance vector routing algorithm assigns weights to each link in the network and computes a "distance" to a destination by summing the weights along each possible path. Distance vector routing requires each router to maintain the distance from itself to each possible destination and the vector, or neighbor, to use to reach that destination. Whenever the network topology changes, each router transmits new distance vectors to each of its neighbors, allowing each to recalculate its routing table. Another well-known routing algorithm is the path-vector routing algorithm in which each router maintains full path information from itself to each destination on the network. Whenever the network topology changes, the router transmits new path information to its neighbors.

For example, the BGP protocol, which is a path vector routing protocol, defines an UPDATE message for transferring routing information between BGP peers. The routers use the information in the BGP UPDATE message to reconstruct their routing tables to describe the relationships of the various autonomous systems. The BGP UPDATE message includes a WITHDRAWN ROUTES field for listing routes that are no longer available and that need to be removed from local routing tables.

Routing tables in large networks may take a long period of time to converge to stable routing information after a network fault. One recognized cause of the delay is temporary oscillations, i.e., changes, that occur within the routing tables until they converge to reflect the current network topology. These oscillations in routing information, often referred to as "flaps," can cause significant problems including intermittent loss of network connectivity as well as increased packet loss and latency. Because the update messages advertise and withdraw routes, but do not specify the particular link that has failed, the routers may incorrectly attempt to use routes that are invalid until convergence of the routing information, resulting in communication problems including intermittent loss of network connectivity as well as increased packet loss and latency

SUMMARY

In general, the embodiments of the invention provide efficient convergence of routing tables, such as those implemented when using path vector protocols like the Border Gateway Protocol (BGP), after a network fault, such as link failure.

In one embodiment, the invention is directed to a method in which a router, upon detecting a network fault, generates link failure information to identify the specific link that has failed. The router communicates the link failure information to neighboring routers in addition to conventional update messages carrying path vector routing information. The first time a router receives the link failure information, the router forwards the information to neighboring routers. After receiving link failure information, the routers ignore any message from neighboring routers advertising a path that relies upon the failed link. When routing data packets, the router retrieves possible routes from a local routing table and disregards any routes that rely upon the failed link. In this fashion, the routers are more likely to use a valid path while the routing tables converge to a stable state. Once a router receives and forwards the link failure information, the router does not re-forward the information, or any update messages that list the failed link, thereby reducing the number of update messages that could otherwise flood a network.

In another embodiment, the invention is directed to a router comprising a database to store link failure information identifying failed links within a computer network. A routing table stores routing information that describes available routes to devices within the computer network. A control unit routes packets through the computer network according to the link failure information and the routing information.

In another embodiment, the invention is directed to a computer-readable medium containing instructions. The instructions cause a programmable processor that has received link failure information identifying a failed link within a computer network, to store the link failure information within a database and route a data packet to nodes within the computer network according to the link failure information within the database, specifically avoiding paths using the failed link.

In another embodiment, the invention is directed to a computer-readable medium containing data structures. A first data structure stores a unique identifier for a failed link within a computer environment. A second data structure stores data defining a valid time for the link failure information. A third data structure stores data defining a storage time for the link failure information. A fourth data structure stores a timestamp indicating when the link failed. A fifth data structure stores a unique identifier for an originator of the link failure information. A sixth data structure stores security data for authenticating the originator.

In another embodiment, the invention is directed to a method comprising detecting, with a first router, failure of a link within a computer network and, in response, generating within the first router link failure information identifying the failed link. The method further comprises communicating an update message from the first router to other routers within the computer network in accordance with a routing protocol. The update message requests withdrawal of one or more routes through the computer network, and each route is specified in the update message as a plurality of nodes without specifying links between the nodes. The update message also includes the generated link failure information to identify the specific link that failed.

In another embodiment, a router comprises a data store to hold link failure information identifying failed links within a computer network, and a routing table to store routing information describing available routes to nodes within the computer network. Each route is described as a path of nodes without identifying links between the nodes. A control unit forwards packets through the computer network based on the link failure information and the routing information. In response to detecting failure of a link, the control unit generates updates the link failure information to identifying the failed link and outputs an update message in accordance with a routing protocol. The update message requests withdrawal of one or more of the routes, and also includes link failure information to identify the detected link that failed.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a block diagram illustrating an example link failure message consistent with the principles of the invention.

DETAILED DESCRIPTION

Figure 1:
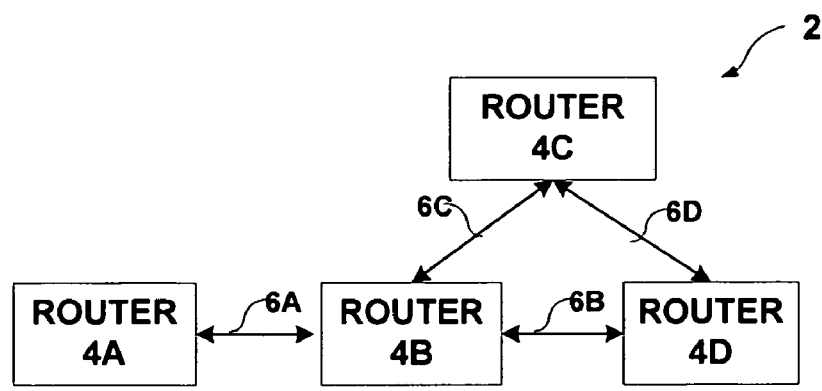
FIG. 1 is a block diagram illustrating an example computer network.

In general, the invention reduces the time that a network using path vector routing protocols, such as BGP, takes to converge to a stable state on the Internet. FIG. 1 is a block diagram illustrating a computer network 2 in which four interconnected routers 4A-4D, referred to collectively as routers 4, communicate data packets and routing information through links 6, which may be any suitable communication links for communicating digital data. Each router operates according to a path vector routing algorithm, such as BGP, and maintains a routing table that describes the available paths through network 2.

In the event of a link failure, such as link 6A, router 4B may issue update messages to routers 4C and 4D indicating that destination 4A is no longer available via 4B. Upon receiving the update message from router 4B, router 4D typically recalculates its routing table to remove the route from router 4B to 4A. Notably, with conventional path vector routing protocols, the routing table of router 4D may incorrectly represent that router 4A is still reachable via router 4C, because router 4D has not received an update message from router 4C indicating otherwise. Not until router 4D receives an update message from router 4C indicating that this route is also unavailable does the routing table of router 4D converge to accurately reflect the current topology of network 2. This temporary oscillation of the routing table of router 4D may cause packets to be incorrectly forwarded, possibly resulting in data loss.

To reduce the convergence time to a stable state, each of routers 4A-4D are configured to generate link failure information to identify a specific link that has failed upon detecting a network fault. In addition to the conventional update messages, the routers communicate the link failure information to neighboring routers. Once routers 4A-4D receive the link failure information, the routers 4A-4D do not attempt to use routes that rely upon the failed link for a period of time referred to herein as the "valid period" for the link forward information. For example, once router 4D receives the link failure information indicating that link 6A has failed, router 4D immediately knows that any path relying on the link is also unavailable, such as path {4C, 4B, 4A} from router 4D to router 4A.

Once a router has received and forwarded link failure information, the router will not re-forward the information to its neighbors for a defined period of time, referred to herein as the "storage period" for the link failure information. This is advantageous in that the number of routing update messages that flood the network 2 as a result of the failure may be greatly reduced.

Each of routers 4A-4D may communicate their link failure information to neighboring routers in several different ways. In one configuration, each of routers 4A-4D embed the link failure information within the conventional update messages, such as BGP UPDATE messages, to identify the particular network links that have failed. In another configuration, each of routers 4 are configured to send a separate link failure message describing the failed link. In either case, each of routers 4A-4D analyze prospective routes based on the link failure information to determine whether they include failed links and revise their routing tables based on the analysis. By using the revised routing tables, routers 4A-4D reduce the likelihood of transmitting packets along paths that include failed links.

In order to further reduce the convergence time to a stable state, router 4 may be configured to propagate link failure messages with higher priority than other packets. Furthermore, routers 4 may be configured to process incoming link failure messages before advertising newly available routes to its neighbors.

Figure 2:
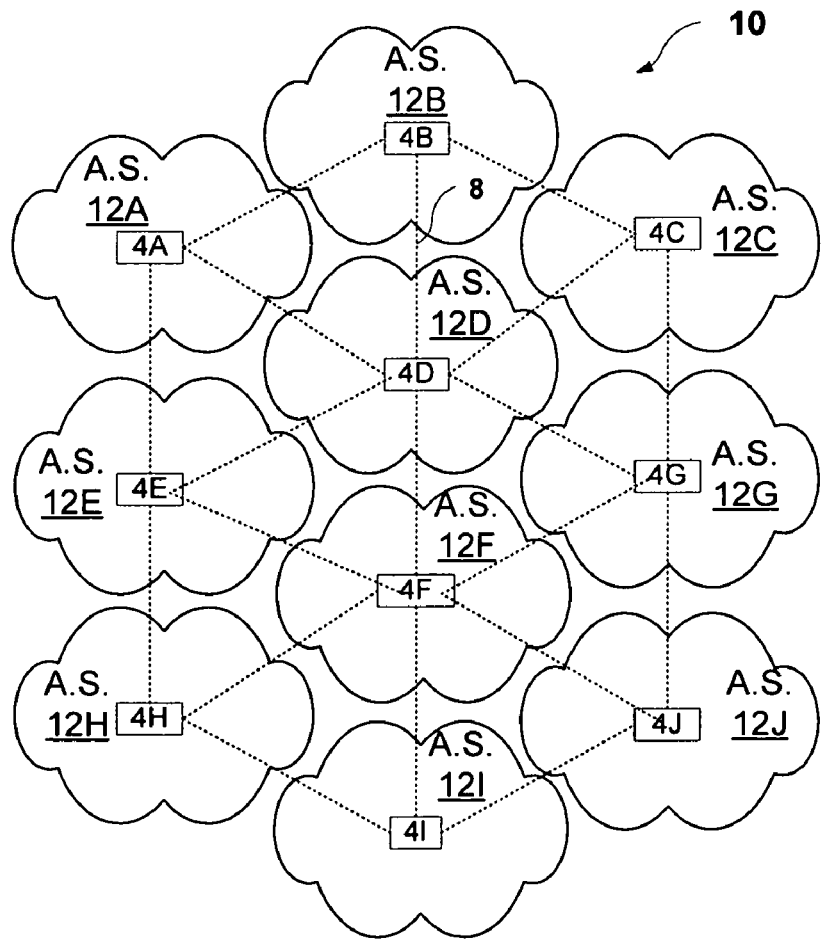
FIG. 2 illustrates a group of autonomous systems (AS) forming a computing network.

FIG. 2 illustrates a group of autonomous systems (AS's) 12A-12J forming a computing network 10. Each AS includes at least one router, illustrated in FIG. 2 as routers 4A-4J. Each AS 12A-12J uses a border protocol, such as BGP, to communicate with neighboring autonomous systems. Specifically, each of autonomous system 12A-12J includes at least one router that uses an external border protocol to share routing information with neighboring autonomous systems 12. Routers 4A-4J may use an internal border protocol, such as internal BGP (IBGP), to exchange routing information within the same autonomous system. In some embodiment, IBGP may be used within an autonomous system to carry external routing and path information, while a separate routing protocol, such as OSPF, IS-IS or RIP, may be used to carry internal routing and path information.

To illustrate the potential for delay in convergence of routing information, consider the routing of data packets from AS 12J to AS 12B. Router 4J maintains a routing table that describes valid routes to AS 12B. To forward a data packet to AS 12B, router 4J retrieves the "best" route from its routing table that identifies AS 12B as the destination. For example, the routing table of router 4J may include the following route: {12F, 12D 12B}, where 12F is the "next hop" from router 4J.

In the event of a link failure, such as link 8, router 4D may broadcast an update message instructing neighboring autonomous systems to withdraw route {12D, 12B} from their routing tables. This message causes neighboring autonomous systems to generate update messages, until router 4J eventually receives one or more update messages from each of neighboring autonomous system 12G, 12F and 12I over a period of time. For example, AS 12F may issue an update message withdrawing route {12F, 12D, 12B}.

Router 4J may, however, select paths that are unavailable until convergence of its routing table. For example, if router 4J receives an update message from router 12F withdrawing route {12F, 12D, 12B} before receiving an update message from 12G, it may try to use path {12G, 12D, 12B} to reach AS 12B until router 4J receives a BGP update message withdrawing this path. Even then, router 4J may then select path {12I, 12F, 12D, 12B} until a corresponding BGP update message is received withdrawing this path. In each case, the selected route includes failed link 8.

This problem may be compounded by the fact that intermediate routers may similarly be misled. For example, router 4F may receive an update message from router 4D prior to receiving any update message from router 4E. This may cause router 4F to assume that path {4E, 4D, 4B} is available. Routing table oscillations within intermediate routers may cause extended oscillation at routers farther removed from failed link 8, such as router 4J. Thus, under conventional path vector routing protocols, routing tables may oscillate over a considerable period of time, and packets may be incorrectly forwarded, based on the order and propagation delays of update messages as they flood outward from the failed link.

In order to reduce the time to convergence to a stable state consistent the principles of the invention router 4D issues link failure messages in addition to the conventional update messages upon detecting failure of link 8. Unlike a conventional update message that may simply indicate destination 12B is unreachable, the link failure message uniquely identifies link 8 as a failed link. Once router 4J receives the link failure message, router 4J does not attempt to use routes that include the failed link 8 during the "valid period" for the link failure information. Furthermore, router 4J ignores any update messages that advertise an available route that includes failed link 8. Thus, the link failure information describes the root of the problem, the failed link, and not just symptoms of the problem, invalid paths. Once a router receives and forwards the link failure message, the router does not re-forward the message, or any update messages that lists link 8 to its neighbors, thereby reducing the number of update messages that may otherwise flood network 10. As described in detail below, router 4J stores the link failure information for the "storage period" for the link failure information, and then automatically deletes the information, thereby treating link 8 as restored.

Figure 3:
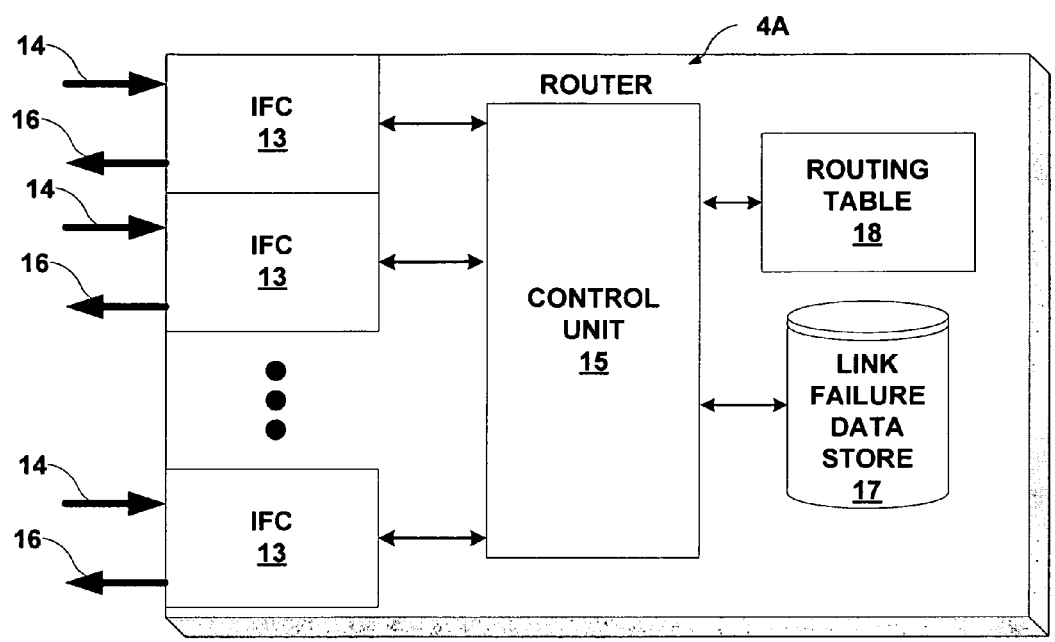
FIG. 3 illustrates an example router consistent with the principles of the invention.

FIG. 3 is a block diagram illustrating an example router 4A configured consistent with the principles of the invention. Router 4A includes one or more interface cards (IFC's) 13 for interfacing with network links 14, 16. Control unit 15 implements a path vector routing algorithm to route inbound packets received from inbound link 14 to the appropriate outbound link 16. Control unit 15 stores path vector routing information in routing table 18 and link failure information in link failure data store 17. In general, control unit 15 represents any unit that routes packets in accordance with a routing table. In one embodiment, control unit 15 may comprise a forwarding engine that analyzes routing table 18 prior to receiving packets and generates a forwarding table that includes only those routes to be used to forward the packets.

Link failure data store 17 may comprise different forms including a table of link failure messages, a flat file stored on a storage medium, or even a database. Upon receiving an inbound packet, control unit 15 examines header information within the packet to identify the destination of the packet. Based on the destination, control unit 15 selects an available route, and forwards the packet to one of the IFC's 13, based on the routing information within routing table 16 and the link failure information within link failure message store 17.

FIG. 4 is a block diagram illustrating an example link failure message 20 generated by a router upon detecting the failure of a link. As described above, the link failure information need not necessarily be in the form of a separate message but may accompany a conventional update message. In this example, message 20 includes an origin ID 22 that uniquely identifies the source router that originally detected the link failure and distributed message 20. For example, the origin identifier 22 may be generated from the Internet Protocol (IP) address of the source router.

Instance ID 24 comprises a unique universal identifier (UUID) that uniquely identifies the particular link failure message 20. In addition, message 20 may include timestamp 26 indicating a date and time that the fault was detected. Link descriptor 28 uniquely identifies the failed link. For example, link descriptor 28 may identify the nodes that the link connects, such as {4B,4D} for link 8 of FIG. 2. Link descriptor 28, in one embodiment, uses the IP addresses for the nodes, e.g., {158.68.12.35,183.34.54.92}, to uniquely identify the nodes.

$TIME_{VALID}$ 30 defines how long a receiving router should use the link failure information to control route selection. Generally, after receiving link failure message 20 and prior to the expiration of $TIME_{VALID}$ 30, the receiving router will not select any paths listed within its routing table that rely upon the link identified by link descriptor 28. $TIME_{STORE}$ 32 defines a time period for which the receiving router should store link failure message within the local data store 17. The time period indicated by $TIME_{STORE}$ 32 may run, for example, from the initial time indicated by timestamp 26. In the event additional messages are received having the same origin ID 22 and instance ID 24 while the receiving router is currently storing the message 20, i.e., prior to the expiration of $TIME_{STORE}$ 32, the receiving router will not forward the link failure message to neighboring routers. Upon the expiration of the storage time, the receiving router deletes the message 20 from the message store.

$TIME_{VALID}$ 30 and $TIME_{STORE}$ 32 may be defined in a variety of ways. For example, they may be defined as absolute times, such as 11:45:59 AM Greenwich Mean Time, or as a time period, such as fifteen minutes, or two days, running from timestamp 26, or from the time the router received message 20. $TIME_{VALID}$ 30 and $TIME_{STORE}$ 32 need not be included within message 20. For example, $TIME_{VALID}$ 30 and $TIME_{STORE}$ 32 may be constants defined within the BGP protocol or configured within each individual router.

The time periods defined by link failure message 20 are advantageous in reducing the convergence interval of routing information when path vector routing algorithms, such as BGP, are used. The time period defined by $TIME_{VALID}$ ensures that a router does not use any route listed within its routing table that includes the failed link. This helps the router avoid invalid routes while the routing tables through the network converge to a stable state. Notably, routes are not necessarily deleted from the routing table in response to a link failure message because, under this scheme, link restoration information is not communicated. In other words, the time period defined by $TIME_{VALID}$ ensures that routes having failed links are not used for a limited duration. Upon the end of the duration, the router automatically activates any routes in the routing table that rely on the link. The time period defined by $TIME_{STORE}$ 32 reduces the flooding of routing information due to a network fault.

In one embodiment, the $TIME_{VALID}$ 30 and $TIME_{STORE}$ 32 can be configured by an administrator in order to allow greater control of the convergence behavior by the administrator. For example, if the time period defined by $TIME_{STORE}$ 32 is too short, the link failure message may be removed from a router prior to receiving the final link failure message from neighboring routers as the message propagates through the various routers of the computer network. This may cause the router to unnecessarily forward the link failure message 20. In this scenario, the routing scheme may degrade to the conventional BGP routing protocol, causing similar routing table oscillations. If the time period defined by $TIME_{VALID}$ 30 is too short, the router may attempt to use a route that has not been restored. In one configuration, the time period defined by $TIME_{STORE}$ 32 is set to ensure that all autonomous systems within the computer network are updated with the link failure information.

Security data 34 represents security information that the originating router may include within link failure message 20 by which receiving routers verify the source of message 20. Security data 34 may be useful in reducing the risk of a denial of service attack, which occurs when a party intentionally floods the network with messages indicating that a path is no longer valid when, in reality, the route has not failed. To limit such attacks, routers can verify that link failure messages 20 are authentic and have originated from a trusted source before trusting the link failure information.

One method for implementing an authentication scheme is to use a public-private key pair in which the originating router encrypts all or a portion of message 20 using a private key. Receiving routers decrypt message 20 using a corresponding public key obtained from a trusted source.

Figure 5:
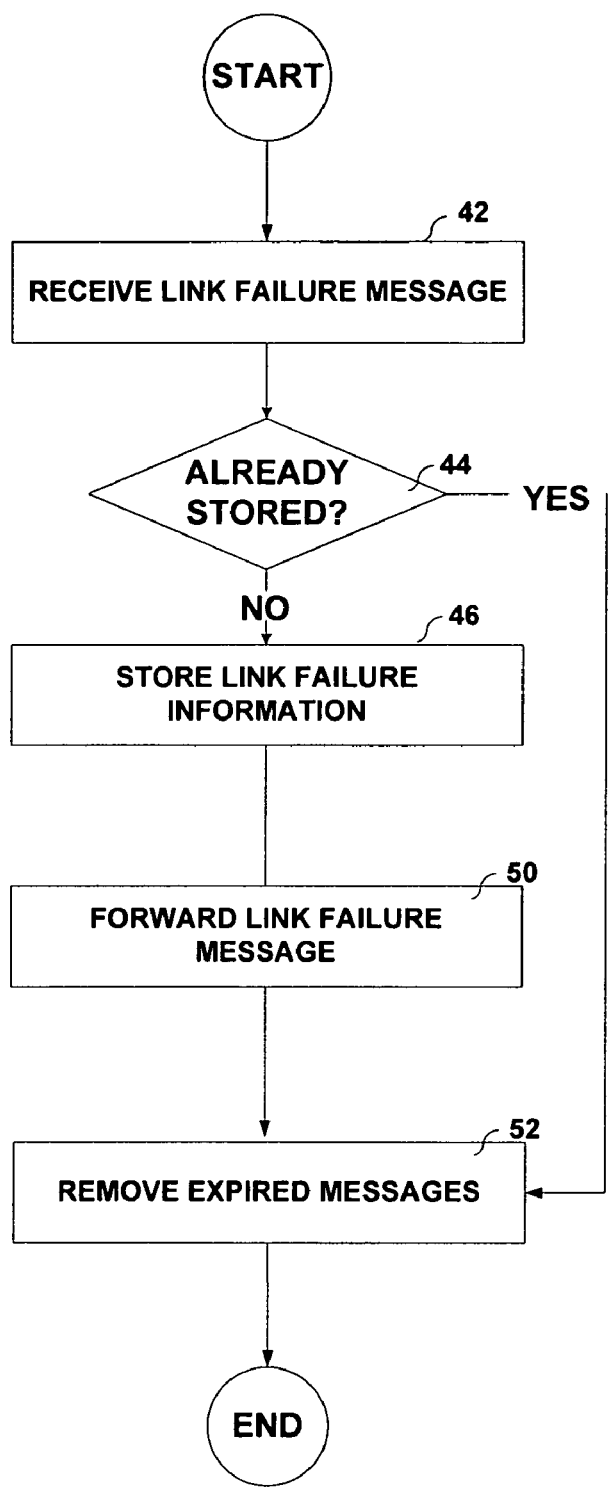
FIG. 5 is a flowchart illustrating an example mode of operation of a router upon receiving a link failure message consistent with the principles of the invention.

FIG. 5 is a flowchart illustrating an example mode of operation for a router upon receiving a link failure message consistent with the principles of the invention (42). Upon receiving the message, the router searches its local data store 17 for a message having an identical origin ID 22, instance ID 24, and timestamp 26 to determine whether the message has already been received and is currently stored with the message store (44). If the message has not already been received, the router adds the message to the link failure data store 17 (46) and forwards the link failure message to neighboring routers (50). If the message has already been received, the router does not forward the link failure message. The router periodically scans the link failure data store 17 and removes link messages that have expired (52), as defined by $TIME_{STORE}$ 32 of FIG. 4.

Figure 6:
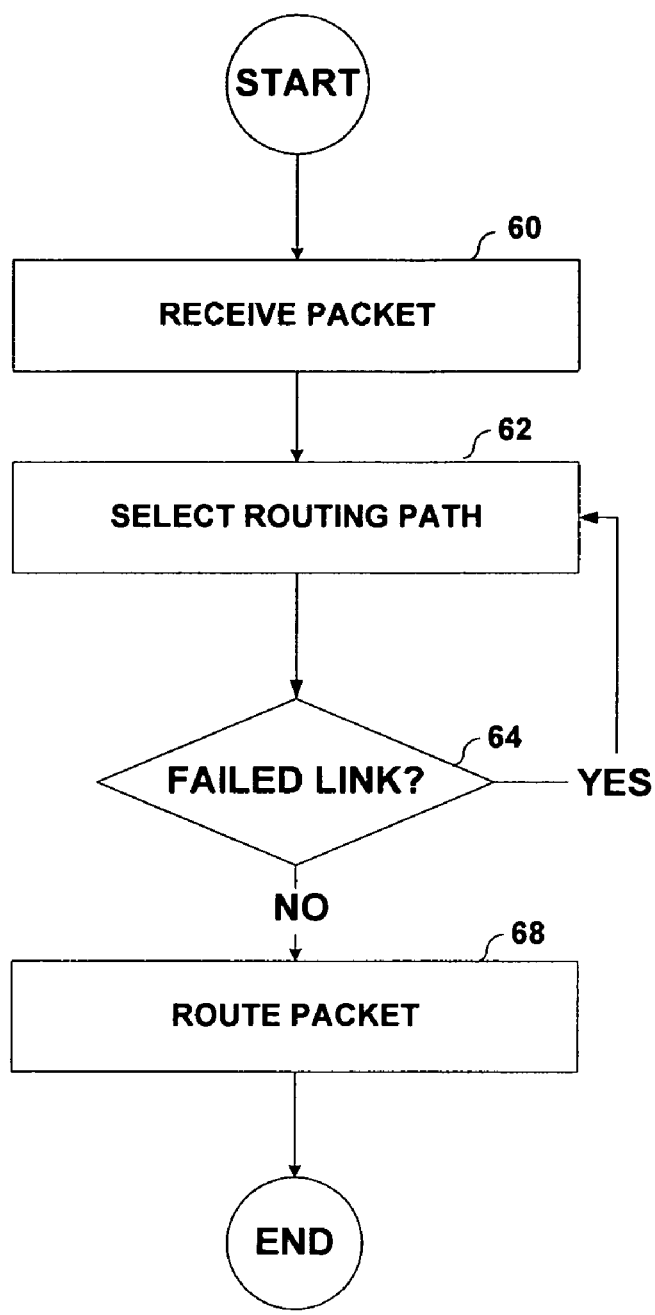
FIG. 6 is a flowchart illustrating an example mode of operation of a router upon receiving a packet to be forwarded consistent with the principles of the invention.

FIG. 6 is a flowchart illustrating an example mode of operation for a router upon receiving a packet to be forwarded consistent with the principles of the invention (60). Upon dequeuing the packet from an inbound queue, the router accesses routing table 18 to select a route for the packet based on the destination for the packet defined in the header of the packet (62). Alternatively, routing table 18 may be analyzed prior to receiving packets in order to generate a forwarding table that includes only those routes to be used when forwarding packets.

After selecting a route, the router then scans the link failure message store to determine whether the selected route relies upon a link that has recently failed (64). If so, the router selects another route (62) until an available route is found that routes the packet around any failed links, or until the local routing table has been exhausted. For example, referring to FIG. 2, router 4J will reject path {12F, 12D, 12B} if a link failure message identifying link 8 is stored within its link failure data store 17. If an available route is found, the router forwards the packet accordingly to the selected path (68).

Figure 7:
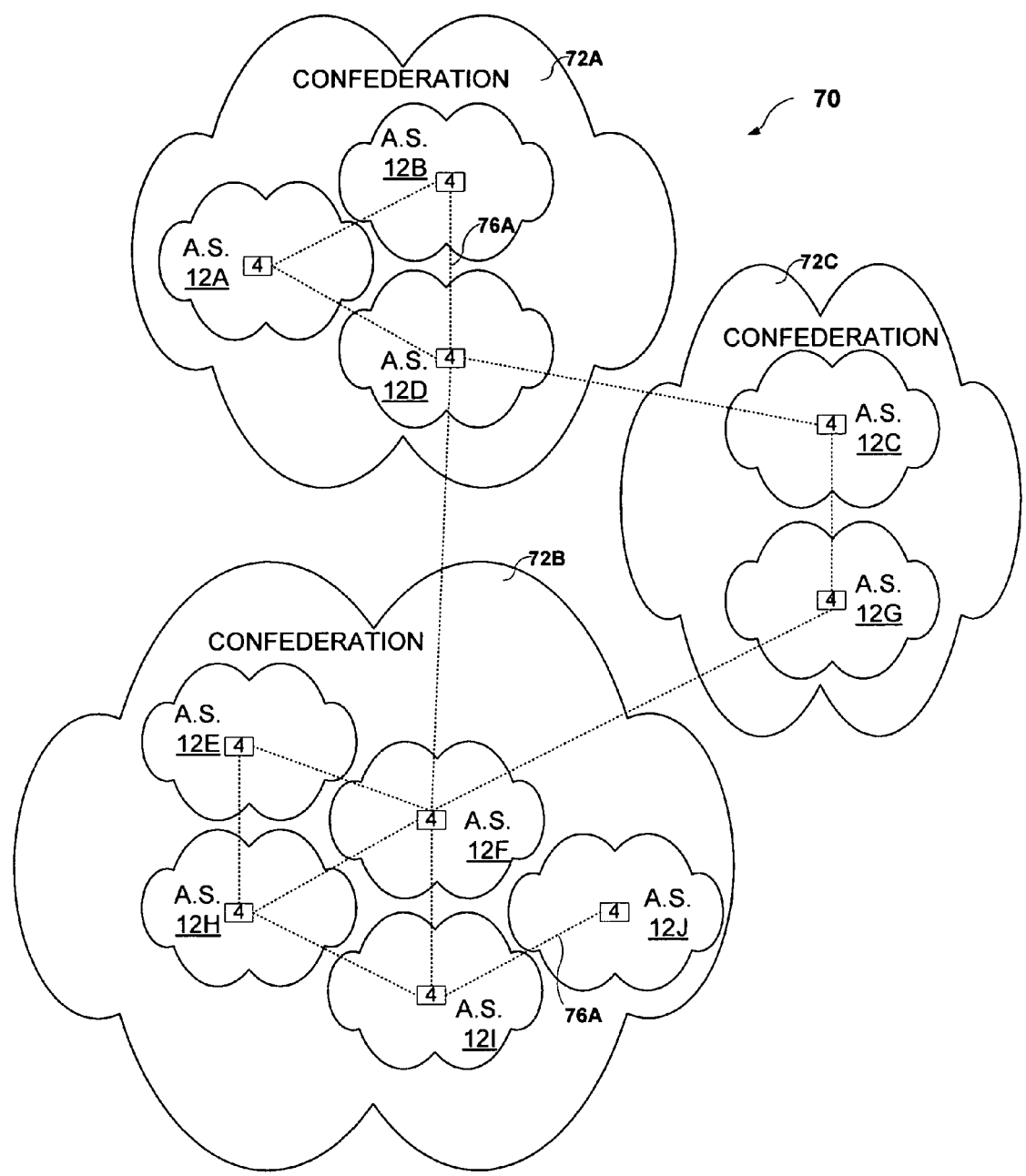
FIG. 7 illustrates a network in which a number of autonomous systems are hierarchically arranged to form "confederations."

FIG. 7 illustrates a network 70 in which a set 12 of autonomous systems 12A-12J are hierarchically arranged to form "confederations" 72. Routers 4 linking confederations 72 are configured to "summarize" routing information and link failure information when exchanging information between confederations 72. For example, if link 76A fails within confederation 72A, router 4 of AS 12D may filter link failure messages at the border of confederation 72A and not pass the link failure information to confederations 72B and 72C because all of the routers 4 within confederation 18A are still reachable by confederations 72B and 72C. If, however, link 76B of confederation 72B fails, then router 4 of AS 12F forwards link failure messages to the other confederations 72 because there is no longer a valid path to AS 12J.

Figure 8:
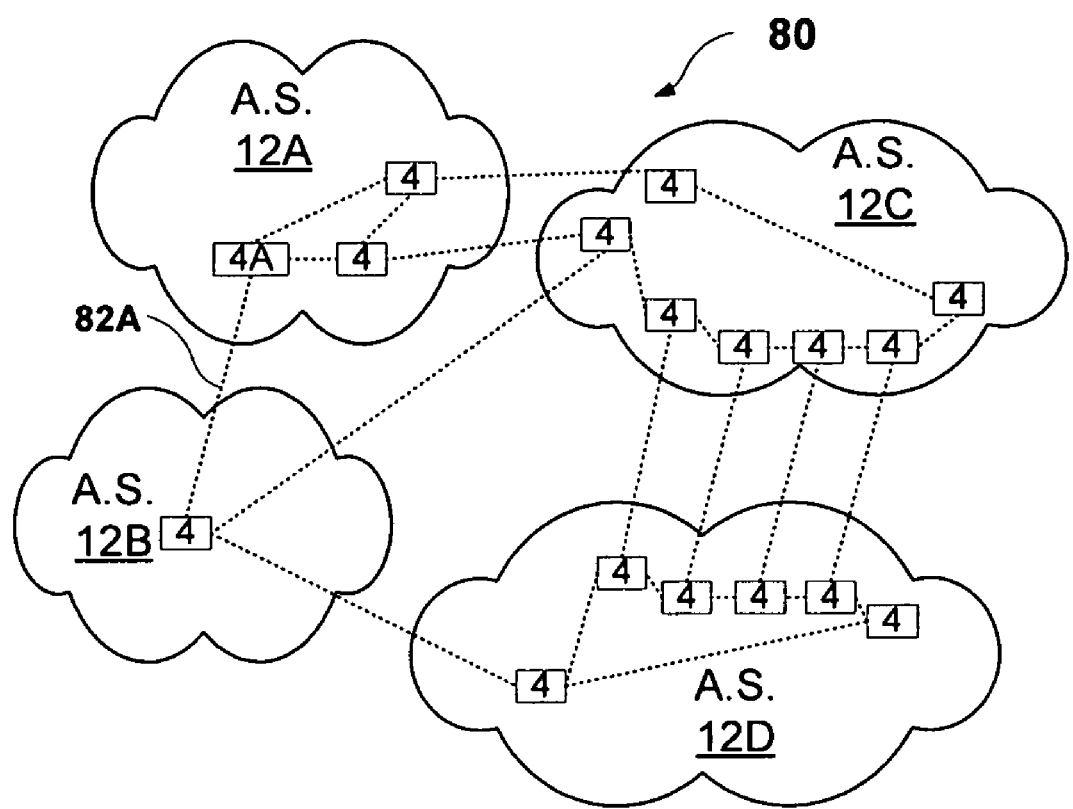
FIG. 8 illustrates another group of autonomous systems (AS) forming a computing network.

FIG. 8 illustrates a network 80 in which a number of autonomous systems 12A-12D are interconnected by routers 4. Network 80 illustrates that an autonomous system may have one or more routers providing a link to a peer autonomous system. Routers 4 may elect to broadcast link failure information depending upon a number of remaining links between the autonomous systems.

For example, AS 12A and AS 12B are connected by a single link 82A. This type of interconnection is common when one of the autonomous systems, such as AS 12B, is obtaining access to the Internet as a customer of another autonomous system, such as AS 12A. In this embodiment, AS 12B typically will not forward a packet for other autonomous systems unless the source or the destination of the packet is within AS 12B. In this case, router 4A of AS 12A creates a message announcing the failure of link 82A, as described above, to allow other routers 4 to quickly select an alternate path via AS 12D as the preferred path.

Another common configuration occurs where two core Internet Service Providers are interconnected by a large number of routers, such as AS 12C and AS 12D. In this case routes are available through different routers 4, possibly with different BGP local preferences. In this case, the failure of any one link between AS 12C and AS 12B may have negligible overall effect on routing in network 80. Thus, in this configuration, routers 4 of AS 12C and AS 12B can be configured to not generate link failure information in the event a connecting link fails.

The interconnections between AS 12A and AS 12C illustrate a less common situation, where there is more than one link between autonomous systems, but few enough links that it is possible that all links could fail simultaneously. Here, routers 4 of AS 12A and AS 12C may be configured to not generate link failure information if a link fails between AS 12A and AS 12C, simply because the simultaneous failure of two links can be much less likely than the failure of a single link. Alternatively, a router within each AS at the border can be configured or elected to be a master router that announces link failures between AS 12A and AS 12 C when its own link (if any) fails and it is notified via an internal message that all the other links between AS 12A and AS 12 C have also failed.

Some protocols, such as BGP, do not identify individual links between autonomous systems, but allow routers 4 to advertise paths to destinations by providing a list of reachable destinations with an associated list of AS numbers. However, these protocols typically allow additional information to be advertised with each AS path. Therefore, in order to ensure the link failure information is correctly associated with the correct routes, it may be useful to include a link identifier in any message, such as message 20 of FIG. 4, that advertises an available route especially when different routes are advertised for different links between two autonomous systems.

Because a large network, such as the Internet, can be a collection of a myriad of smaller networks, a situation may arise where some autonomous systems support the techniques described herein while others do not. Notably, the techniques can improve convergence even when only a subset of the autonomous systems implements the techniques consistent with the principles of the invention described herein. In this situation, routers supporting the techniques described herein may be configured to inform neighbors that the techniques are supported. Typically this can be implemented by extending the protocol in such a way that routers that do not support the techniques will ignore the additional information.

For example, during the normal BGP "Hello" exchange a router can determine whether its BGP neighbors support the techniques described herein. In this manner, link failure messages are communicated only to neighbors that understand the format of the message. This allows link failure information to be communicated between any group of contiguous routers that support the techniques.

In addition, it is often possible for a protocol, such as BGP, to be used between routers that are not physically linked. Therefore, administrators can manually configure routers to exchange link failure information with other specific routers that may not be physically linked.

Various embodiments of the invention have been described. The invention reduces the time that a network using path vector routing protocols, such as BGP, takes to converge to a stable state. Link failure information is broadcasted to neighboring routers in the event a link failure is detected. The link failure information may take the form of a separate message or may be appended to conventional update messages. These and other embodiments are within the scope of the following claims.

The invention claimed is:

1. A method comprising:
    detecting, with a first router, failure of a link within a computer network;
    in response to detecting the failure of a link, generating with the first router link failure information identifying the failed link, wherein generating link failure information includes generating data defining a valid time period for storing the link failure information;
    communicating an update message from the first router to other routers within the computer network in accordance with a routing protocol, wherein the update message requests withdrawal of one or more routes through the computer network and each route is specified in the update message as a plurality of nodes without specifying links between the nodes, and wherein the update message also includes the generated link failure information to identify the link that failed;
    routing packets according to the link failure information prior to expiration of the valid time period for the link failure information; and
    routing the packet without using the link failure information after the expiration of the valid time period.

2. The method of claim 1 further comprising generating the update message to conform to the Border Gateway Protocol (BGP).

3. The method of claim 1, wherein routing packets according to the link failure information comprises routing data packets according to a path vector routing algorithm using the link failure information.

4. The method of claim 1, wherein routing packets according to the link failure information comprises:
    receiving a packet identifying a destination within the computer network; and
    forwarding the packet according to a path vector routing protocol using the link failure information by discarding routes from a routing table when the routes define paths that use the failed link.

5. The method of claim 1 further comprising:
    storing the link failure information for a storage time period; and
    forwarding any copies of the link failure information received from the other routers only after expiration of the storage time period.

6. The method of claim 1 wherein routing packets according to the link failure information comprises:
    authenticating the link failure information: and
    routing packets using the link failure information when the link failure information is authenticated.

7. The method of claim 6, wherein authenticating the link failure information comprises verifying that the link failure information originated from a neighboring router.

* * * * *